US012469380B2

(12) United States Patent
Falk et al.

(10) Patent No.: US 12,469,380 B2
(45) Date of Patent: Nov. 11, 2025

(54) PREDICT AND TRIGGER A FUTURE RESPONSE TO A PREDICTED BACKGROUND NOISE BASED ON A SEQUENCE OF SOUNDS

(71) Applicant: Telefonaktiebolaget LM Ericsson (publ), Stockholm (SE)

(72) Inventors: Tommy Falk, Spånga (SE); Tommy Arngren, Södra Sunderbyn (SE); Peter Ökvist, Luleå (SE); Andreas Kristensson, Södra Sanby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 106 days.

(21) Appl. No.: 18/282,324

(22) PCT Filed: Mar. 18, 2021

(86) PCT No.: PCT/EP2021/057015
§ 371 (c)(1),
(2) Date: Sep. 15, 2023

(87) PCT Pub. No.: WO2022/194381
PCT Pub. Date: Sep. 22, 2022

(65) Prior Publication Data
US 2024/0177595 A1 May 30, 2024

(51) Int. Cl.
*G08B 19/00* (2006.01)
*G08B 31/00* (2006.01)
*G10K 11/178* (2006.01)

(52) U.S. Cl.
CPC ........ *G08B 31/00* (2013.01); *G10K 11/17881* (2018.01)

(58) Field of Classification Search
CPC .. G08B 31/00; G10K 11/17881; H03G 3/342; G10L 25/30; G10L 25/51
(Continued)

(56) References Cited

U.S. PATENT DOCUMENTS

2005/0131705 A1* 6/2005 Gandhi .............. G08B 13/1672 704/273
2018/0121540 A1 5/2018 Sporer et al.
(Continued)

FOREIGN PATENT DOCUMENTS

EP 3779810 A1 2/2021

OTHER PUBLICATIONS

International Search Report and Written Opinion of the International Searching Authority, PCT/EP2021/057015, mailed Dec. 14, 2021, 9 pages.
(Continued)

*Primary Examiner* — Tai T Nguyen
(74) *Attorney, Agent, or Firm* — Sage Patent Group

(57) ABSTRACT

A device performing operations including identifying occurrence of a trigger sound in the at least one microphone signal. Operations also include predicting probability of occurrence of a subsequent sound having a defined disturbance characteristic in the at least one microphone signal following the occurrence of the trigger sound. Operations further include triggering a remedial action to be performed to mute the at least one microphone signal or to suppress the subsequent sound in the at least one microphone signal when the probability of occurrence of the subsequent sound having the defined disturbance characteristic satisfies a remedial action rule.

16 Claims, 10 Drawing Sheets

(58) Field of Classification Search
USPC .......................................................... 340/521
See application file for complete search history.

(56) References Cited

U.S. PATENT DOCUMENTS

| | | | | |
|---|---|---|---|---|
| 2020/0184987 | A1 | 6/2020 | Kupryjanow et al. | |
| 2021/0151065 | A1* | 5/2021 | Lindstrom .............. | G10L 25/30 |
| 2021/0286585 | A1* | 9/2021 | Carman .................. | G10L 25/51 |
| 2021/0377587 | A1* | 12/2021 | Ekanayake ............ | H04N 7/142 |
| 2022/0301535 | A1* | 9/2022 | Wright ................... | G06Q 50/18 |

OTHER PUBLICATIONS

Wikipedia, "Active noise control," Downloaded from the Internet on Feb. 3, 2021 from: https://en.wikipedia.org/wiki/Active_noise_control, 4 pages.

Grinstead, Charles M. et al., "Introduction to Probability," Second Edition, Chapter 11, Marchov Chains; American Mathematical Society, 1997, 67 pages.

Wikipedia, "Hearing protection device," Downloaded from the Internet on Feb. 3, 2021 from: https://en.wikipedia.org/wiki/Hearing_protection_device, 6 pages.

Wikipedia, "Machine learning," Downloaded from the Internet on Feb. 3, 2021 from: https://en.wikipedia.org/wiki/Machine_learning, 6 pages.

Venturebeat, "Microsoft Teams passes 44 million daily active users, thanks in part to coronavirus," Downloaded from the Internet on Feb. 3, 2021 from: https://venturebeat.com/2020/03/19/microsoft-teams-passes-44-million-daily-active-users-thanks-in-part-to-coronavirus/, 7 pages.

Mspoweruser, "Microsoft Teams to get improved AI-based real-time noise suppression," Downloaded from the Internet on Feb. 3, 2021 from: https://mspoweruser.com/microsoft-teams-to-get-improved-ai-based-noise-suppression/, 3 pages.

D. S. Myers, L. Wallin, and P. Wikstrom, "An introduction to Markov chains and their applications within finance," MVE220 Financial Risk: Reading Project , Chalmers/CTH, Gothenburg, SE, 2017, 8 pages.

* cited by examiner

PREDICT AND TRIGGER A FUTURE RESPONSE TO A PREDICTED BACKGROUND NOISE BASED ON A SEQUENCE OF SOUNDS

CROSS REFERENCE TO RELATED APPLICATIONS

This application is a 35 U.S.C. § 371 national stage application of PCT International Application No. PCT/EP2021/057015 filed on Mar. 18, 2021, the disclosure and content of which is incorporated by reference herein in its entirety.

TECHNICAL FIELD

The present disclosure relates to electronic devices that actively cancel or reduce noise present in microphone signals such as during online meetings.

BACKGROUND

There exist several solutions for hearing protection, noise cancellation and solutions for dealing with unwanted sounds related to online meetings.

One example is noise cancelling headphones that suppress or block outside noise and allow a wearer to focus on favorite songs or ongoing conversation. The technology, known as active noise control (ANC), works by using microphones to pick up (low-frequency) noise and neutralize it before it reaches the ear. Active noise control (ANC), also known as noise cancellation, or active noise reduction (ANR), is a method for reducing unwanted sound by the addition of a second sound specifically designed to cancel the first. The headset generates a sound signal that is phase-inverted by 180 degrees to the unwanted noise, resulting in the two sounds cancelling each other out.

Another example is hearing protection devices (HPD), that reduce sound reaching the eardrum through a combination of electronic and structural components. HPD, is an ear protection device worn in or over the ears while exposed to hazardous noise to help prevent noise-induced hearing loss. HPDs reduce (not eliminate) the level of the noise entering the ear. HPDs can also protect against other effects of noise exposure such as tinnitus and hyperacusis. There are many different types of HPDs available for use, including earmuffs, earplugs, electronic hearing protection devices, and semi-insert devices. Some electronic HPDs, known as Hearing Enhancement Protection Systems, provide hearing protection from high-level sounds while allowing transmission of other sounds like speech. Some also have the ability to amplify low-level sounds. This type may be beneficial for users who are in noisy environments, but still need access to lower-level sounds. For example, hunters who rely on detecting and localizing soft sounds of wildlife but still wish to protect their hearing from firearm blasts.

Microsoft has demonstrated real time noise suppression using artificial intelligence (AI) to detect and suppress distracting background noise during a call. Real-time noise suppression will filter out someone typing on their keyboard while in a meeting, the rustling of a bag of chips, and a vacuum cleaner running in the background. AI will remove background noise in real-time so you can hear only speech on the call.

Noise suppression has existed in Microsoft Teams, Skype, and Skype for Business apps for years. Other communication tools and video conferencing apps have some form of noise suppression as well. But that noise suppression covers stationary noise, such as a computer fan or air conditioner running in the background. The traditional noise suppression method is to look for speech pauses, estimate the baseline of noise, assume that the continuous background noise does not change over time, and filter it out.

It is not trivial to isolate the sound of human voices from unwanted background sounds because they may overlap in the same frequencies. On a spectrogram of a speech signal, unwanted noise appears in the gaps between speech and overlapping with the speech. It is thus next to impossible to filter out the noise—if speech and noise overlap, the algorithms cannot distinguish the two. Instead, the algorithms may need to train a neural network beforehand on what noise looks like and consequently speech looks like. Microsoft trains a machine learning model to understand the difference between noise and speech, and then the machine learning model is trying to suppress the noise while keeping the speech unaffected during inference.

Machine learning includes computer algorithms that improve automatically through experience. It is seen as a part of artificial intelligence. Machine learning algorithms build a model based on sample data, known as "training data", in order to make predictions or decisions without being explicitly programmed to do so. Machine learning algorithms are used in a wide variety of applications, such as email filtering and computer vision, where it is difficult or unfeasible to develop conventional algorithms to perform the needed tasks.

SUMMARY

Some embodiments disclosed herein are directed to a device that includes at least one processor configured to receive at least one microphone signal from at least one microphone and at least one memory storing program code executable by at least one processor. Operations performed by the at least one processor include identifying occurrence of a trigger sound in the at least one microphone signal. Operations also include predicting probability of occurrence of a subsequent sound having a defined disturbance characteristic in the at least one microphone signal following the occurrence of the trigger sound. Operations also include triggering a remedial action to be performed to mute the at least one microphone signal or to suppress the subsequent sound in the at least one microphone signal when the probability of occurrence of the subsequent sound having the defined disturbance characteristic satisfies a remedial action rule.

Some embodiments are directed to a method by a device that includes identifying occurrence of a trigger sound in at least one microphone signal received from at least one microphone. The method also includes predicting probability of occurrence of a subsequent sound having a defined disturbance characteristic in the at least one microphone signal following the occurrence of the trigger sound. The method also includes triggering a remedial action to be performed to mute the at least one microphone signal or to suppress the subsequent sound in the at least one microphone signal when the probability of occurrence of the subsequent sound having the defined disturbance characteristic satisfies a remedial action rule.

Some embodiments are directed to a computer program product including a non-transitory computer readable medium storing program code executable by at least on processor of a device to perform operations. The operations include identifying occurrence of a trigger sound in at least one microphone signal received from at least one microphone. The operations also include predicting probability of occurrence of a subsequent sound having a defined disturbance characteristic in the at least one microphone signal following the occurrence of the trigger sound. The operations also include triggering a remedial action to be performed to mute the at least one microphone signal or to suppress the subsequent sound in the at least one microphone signal when the probability of occurrence of the subsequent sound having the defined disturbance characteristic satisfies a remedial action rule.

Numerous potential advantages can be provided by these and further operations of the device which are disclosed herein. Potential advantages of the present disclosure include quicker response to unwanted sounds while involved in an online meeting since the operations predict the probability of occurrence of a subsequent sound having a defined disturbance characteristic, and can then respond thereto by triggering a remedial action rule to mute or suppress the subsequent sound before it occurs. Performing such remedial action before the subsequent sound having the defined disturbance characteristic occurs can avoid having any part of the subsequent sound being transmitted to remote participants in the online meeting.

Other devices, methods and computer program products according to embodiments will be or become apparent to one with skill in the art upon review of the following drawings and detailed description. It is intended that all such devices, methods and computer program products be included within this description, be within the scope of the present disclosure, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Various embodiments of the present disclosure describe a device and a method that use artificial intelligence (AI) or other machine learning to suppress or mute unwanted sounds by analyzing a sequence of sounds and their correlated relations in time and space.

Existing active noise cancelation techniques are not adequate for suppressing background noise from being transmitted to participants in an online meeting.

Hearing protection devices (HPDs) are directed to reducing the sound reaching a local listener's eardrum in case of loud sounds from e.g. a firearm blast, by attempting to rapidly suppress noise having high transients. HPD techniques are also not adequate for suppressing background noise from being transmitted to participants in an online meeting.

Microsoft has demonstrated real-time noise suppression using artificial intelligence to detect and suppress distracting background noise during a call. However, a difficult problem is to isolate the sound of human voices because other noises also happen at the same time. One alternative is to train a machine learning model to understand the difference between noise and speech.

Also, it is difficult to suppress sudden high transient sounds both in terms of detection and appropriate action. For example, a dog bark or a door slam both have short but high peak transients, which requires instant suppression or muting. If the muting or suppression is not fast enough then at least some portion of the noise will pass through. Typically machine learning models need a certain time for detection or classification of sounds, which may lead to a too late noise remediation response and a portion of the noise being transmitted to other devices.

Figure 1:
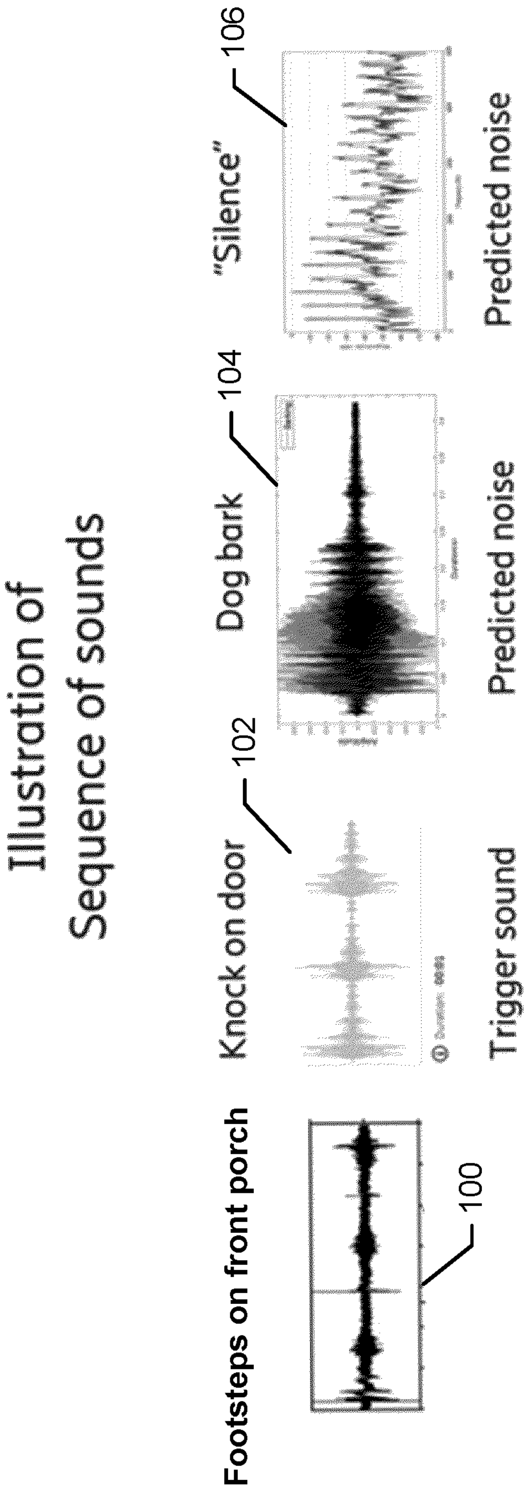
FIG. 1 illustrates an example of a sequence of sounds that can be processed by a device to suppress sound having a defined disturbance characteristic in accordance with some embodiments of the present disclosure.

FIG. 1 illustrates an example of a sequence of sounds that can be processed by a device to suppress sound having a defined disturbance characteristic in accordance with some embodiments of the present disclosure. The example sequence of sounds include at least some of the following: detectable sounds 100 that do not trigger a reaction by the device such as sound of footsteps on a front porch, triggering sounds 102 such as a knock on a door, predicted noise 104 such as a dog bark, and a person yelling "silence" 106 following the dog bark. This sequence of sounds may have a high probability of occurrence following the occurrence of an initial triggering sound, which in the illustrated example is the sound of footsteps on the front porch 100. For example, a package delivery person walking on the front porch approaching the door can generate the sounds 100, followed by knocking on the door 102, which triggers a dog to bark 104, after which a person yells "silence" 106.

Various embodiments of the present disclosure are directed to using AI to suppress or mute unwanted sounds by analyzing a sequence of sounds, such as the sequence of sounds illustrated in FIG. 1, and their individual relations in time and space to predict the probability of occurrence of a subsequent or sequence of subsequent sounds occurring following a presently occurring trigger sound.

Figure 2:
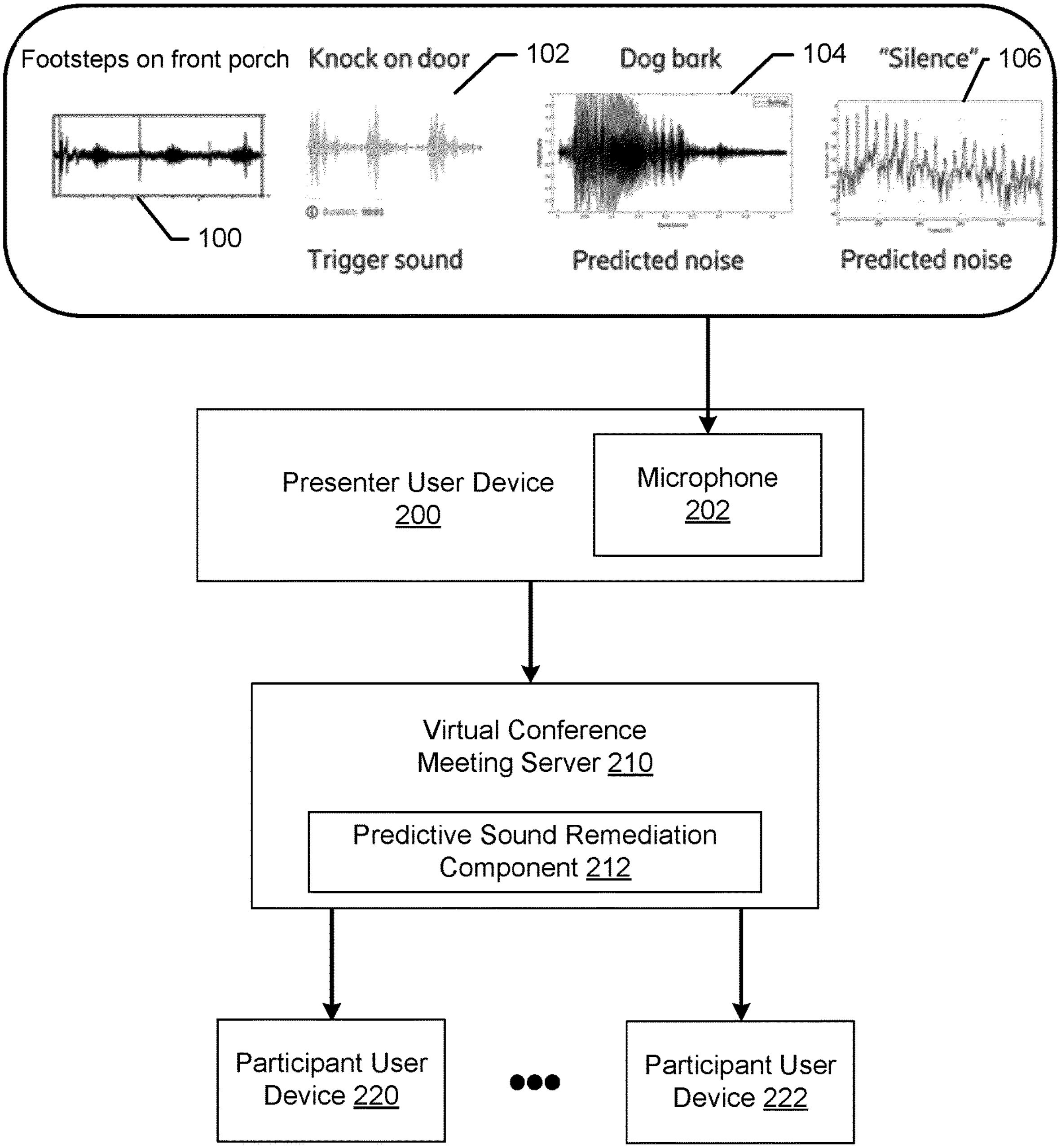
FIG. 2 illustrates a system diagram containing components that are configured to operate in accordance with some embodiments of the present disclosure.

FIG. 2 illustrates a system diagram containing components that are configured to operate in accordance with some embodiments of the present disclosure. In this illustrated system, a microphone 202 of a presenter user device 200 ("device") detects a sequence of sounds such as at least some of the sounds 100, 102, 104, and 106.

The presenter user device 200 may be, for example, a laptop computer, tablet computer, smartphone, extended reality headset, etc. The presenter user device 200 includes at least one processor that is configured to receive at least one microphone signal from at least one microphone 202 and may be configured to provide an audio signal to speakers. The microphone 202 and any speaker may be physically or wirelessly (e.g., Bluetooth or Wi-Fi headphones) connected to the presenter user device 200. Multiple microphones or arrays of microphones and/or speakers may be physically or wirelessly connected to the presenter user device 200.

The presenter user device 200 may be communicatively coupled to a virtual conference meeting server 210. The virtual conference meeting server 210 may include a predictive sound remediation component 212. The predictive sound remediation component 212 may alternatively be located in the presenter user device 200. The predictive sound remediation component 212 may be trained using a machine learning algorithm. The virtual conference meeting server 210 is configured to provide an audio stream from the presenter user device 200 to participant user devices 220 and 222 through wired and/or wireless network connections.

In accordance with various embodiments disclosed herein, the system via the predictive sound remediation component 212 can be configured to predict the probability of occurrence of a subsequent sound, e.g., knock on door 102 and dog bark 104, having a defined disturbance characteristic in the microphone signal following the occurrence of the trigger sound, e.g., footsteps on front porch 100. When the probability of occurrence of the subsequent sound having the defined disturbance characteristic satisfies a remedial action rule, the system can trigger a remedial action to be performed to mute the microphone signal or to suppress the subsequent sound in the microphone signal.

Figure 3:
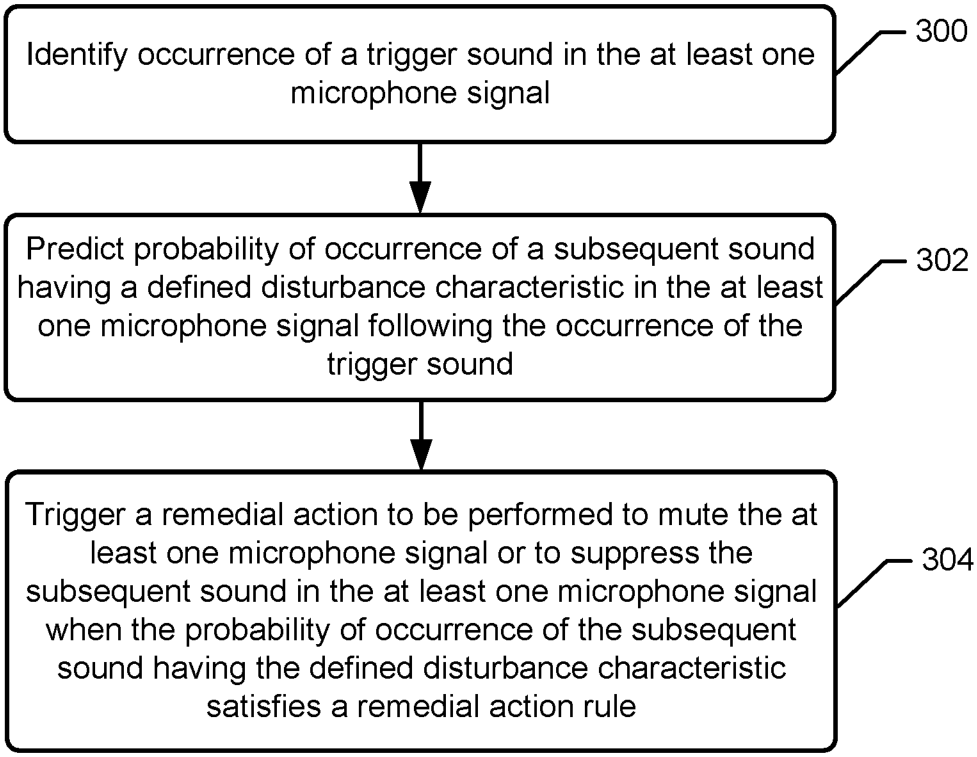
FIGS. 3 through 8 illustrates flowcharts of operations performed by a device in accordance with some embodiments of the present disclosure.

FIG. 3 illustrates flowchart of operations performed by a device, such as the presenter user device 200 and/or the virtual conference meeting server 210, in accordance with some embodiments of the present disclosure. For convenience of reference, the operations of FIG. 3 are described in the context of being performed by the virtual conference meeting server 210 although they may additionally or alternatively be performed by the presenter user device 200 and/or by another component of the system.

In some embodiments, the virtual conference meeting server 210 is configured to identify 300 occurrence of a trigger sound (e.g., "footsteps on front porch" 100 and/or "knock on the door" 102) in the at least one microphone signal. The virtual conference meeting server 210 is further configured to predict 302 probability of occurrence of a subsequent sound (e.g., "dog bark" 104) having a defined disturbance characteristic in the at least one microphone signal following the occurrence of the trigger sound (e.g., "footsteps on front porch" 100 and/or "knock on the door" 102). The device is further configured to trigger 304 a remedial action to be performed to mute the at least one microphone signal or to suppress the subsequent sound (e.g., "dog bark" 104) and yelled word "silence" 106 in the at least one microphone signal when the probability of occurrence of the subsequent sound (e.g., "dog bark" 104 and "silence" 106) having the defined disturbance characteristic satisfies a remedial action rule.

A potential advantage of some embodiments of the present disclosure is that they provide a fast response to a trigger sound and can initiate a remedial action before occurrence of the subsequent sound (e.g., "dog bark" 104 and "silence" 106) having the defined disturbance characteristic. During on-line meetings these embodiments may avoid any portion of the subsequent sound in a microphone signal of the presenter user device 200 from being transmitted in an audio stream to the participant user devices 220 and 222.

In some embodiments, the prediction 302 of the probability of occurrence of the subsequent sound having the defined disturbance characteristic in the at least one microphone signal includes predicting the probability of occurrence of the subsequent sound satisfying a defined disturbance level.

In some embodiments, the prediction 302 of the probability of occurrence of the subsequent sound satisfying the defined disturbance level, comprises determining probability of at least one of the following conditions being met: a predicted peak decibel level of the subsequent sound exceeding a peak threshold; a predicted duration of the subsequent sound exceeding a duration threshold; a predicted frequency component of the subsequent sound being within a defined frequency band; and the subsequent sound having a predicted sound category that has been defined as unacceptable.

A machine learning model can be trained to detect a certain sound, i.e. a trigger-sound, in a sequence of detected ambient sounds. The trigger-sound is then used to predict next sound(s) in a sequence of sounds, and predict a probability X of the next sound occurring which has defined disturbance characteristics. If a next sound in a sequence of sounds is predicted with X probability and Y defined disturbance characteristic, then: if X and Y are less than a threshold (e.g., do not satisfy a threshold rule), then the operations predict the probability of occurrence of a further next sound in a sequence of sounds; and if X and Y are greater than or equal to a threshold (e.g., satisfy the threshold rule), then the operations trigger an action which can include muting the microphone signal or performing sound suppression.

Various embodiments may be coupled to an on-line meeting application, such as Microsoft Teams or Zoom, and configured to provide to the on-line meeting application an indication that a predicted unwanted sound that will soon appear (e.g., within millisecond, seconds, or minutes) to trigger the on-line meeting application to mute or suppress the sound before it occurs. For example, the on-line meeting application may be provided a countdown signal indicating a predicted amount of time remaining before occurrence of the expected sound-disturbance that is to be muted or suppressed. The on-line meeting application may be instructed as to which of a plurality of microphone signals is to be muted or suppressed and the duration of the expected sound-disturbance so that the on-line meeting application can accordingly control the duration of the microphone signal muting or sound suppression. The action that is triggered may be to mute all microphones, a selected subset of microphones, a specific microphone, or a hardware port associated with a microphone. The action that is triggered may also or alternatively be to adjust detection thresholds or other probability parameters of the algorithm that detects and or classifies sounds.

In some embodiments, the determination of when the probability of occurrence of the subsequent sound having the defined disturbance characteristic satisfies the remedial action rule, includes determining whether at least one of the following context parameters satisfies the remedial action rule: device location data when the trigger sound occurs; time data when the trigger sound occurs; date data when the trigger sound occurs; characteristic of a background noise component in the at least one microphone signal; user input data indicating whether the remedial action is to be triggered; indication that a defined sound source type has been identified by a camera; and user demographic characteristics. An example indication that a defined sound source type has been identified by a camera is an indication that a security camera has indicated presence of a dog.

The sensitivity of the operations for predicting probability of occurrence of a subsequent sound, defining what is a defined disturbance characteristic, and/or defining what is a remedial action rule can be adapted based on context parameters. An example context parameter may be set to indicate whether the user is at work or at home. The context parameters can be defined to adapt to certain pre-determined contexts, such as "home alone" or "at home with family" or "at home with pets", etc. The context parameters may indicate the user's surroundings such as within an outdoor park, within a first responder station such as a fire station, within a car, within a train, within an airplane, etc. The context parameters may indicate the location of the user, the time and date, etc. The context parameters may indicate how the device is being used, such as for work, personal use, etc.

The sensitivity of the operations for predicting probability of occurrence of a subsequent sound, defining what is a defined disturbance characteristic, and/or defining what is a remedial action rule can be increased or decreased between defined thresholds or ranges of thresholds (high-medium-low). For example, sound levels that are associated with a disturbance level "high" in the context of "at work" may be associated with a disturbance level "low" in the context at home alone during weekends.

Another aspect of some of the embodiments is that other sensors can be used to provide input to the operations, such as to a machine learning model, about the context parameters. For example, a video camera can generate a context parameter based on identifying presence of a dog, a microphone can generate a context parameter based on hearing relatively high background noise in a work environment, a context parameter may be generated based on determining that a user is logged onto a home network, a context parameter may be defined to indicate the user is likely present in a certain environment based on time of day, etc.

In another embodiment a machine learning model and/or parts of a machine learning model can be trained centrally based on general sound sequences and/or sound sequences gathered from a demographic population, and then the trained model is provided to the predictive sound remediation component 212.

Figure 4:
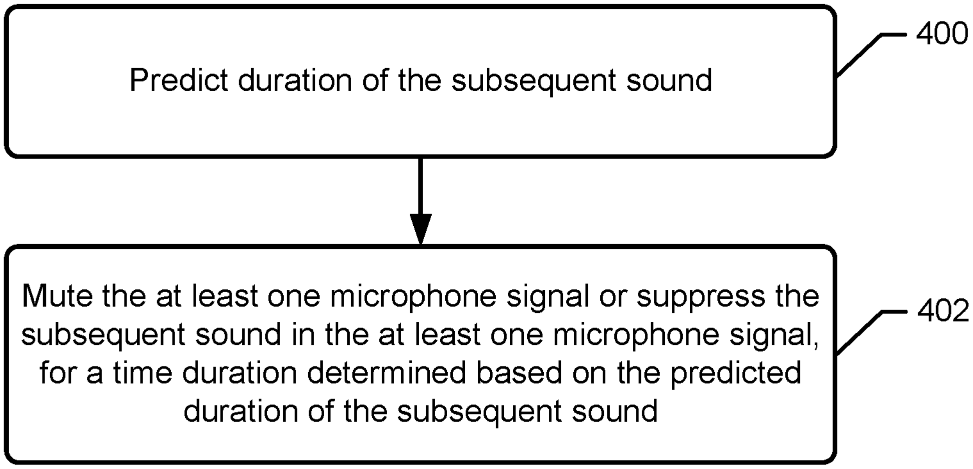
Figure 5:
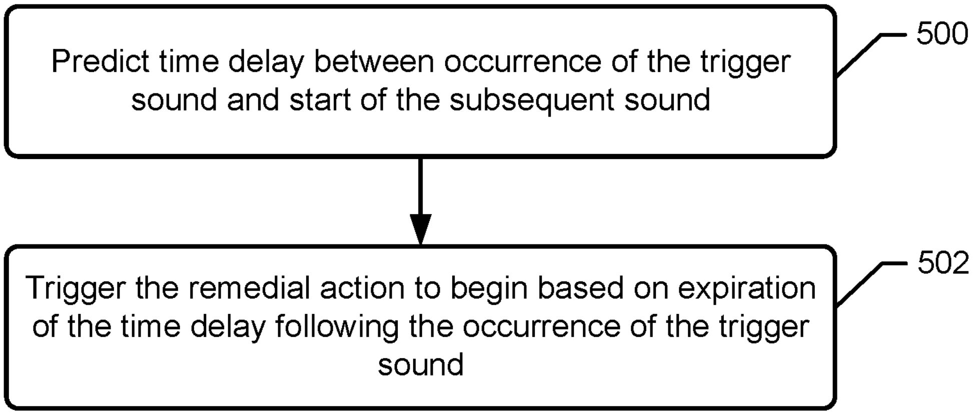

FIGS. 4 and 5 illustrate flowcharts of operations performed by the device, such as the presenter user device 200 and/or the virtual conference meeting server 210, performing muting and suppressing techniques in accordance with some embodiments of the present disclosure.

Referring initially to FIG. 4, the operation to trigger 304 the remedial action to be performed to mute the at least one microphone signal or to suppress the subsequent sound in the at least one microphone signal, includes predicting 400 duration of the subsequent sound. The operations then mute 402 the at least one microphone signal or suppress 402 the subsequent sound in the at least one microphone signal, for a time duration determined based on the predicting duration of the subsequent sound.

Referring now to FIG. 5, the operation to trigger 304 the remedial action to be performed to mute the at least one microphone signal or to suppress the subsequent sound in the at least one microphone signal, includes predicting 500 time delay between occurrence of the trigger sound and start of the subsequent sound. The operations then trigger 502 the remedial action to begin based on expiration of the time delay following the occurrence of the trigger sound.

Auto muting may be performed by the presenter user device 200 participating in an online video meeting. The predictive sound remediation component 212 may be part of an online meeting application and may use a trained machine learning model that is executed locally and/or in the virtual conference meeting server 210. The machine learning model can be configured to identify a large number of sound sequences related to different contexts and how the sounds are mutually related (correlated to occur in time).

In one example, a user of the presenter user device 200 participates in an on-line meeting from home, and the context parameters can be defined to indicate that a wife, kids, and a barky dog are present at the home. In this scenario, a person approaching the front door of the house causes sounds 100 of footsteps on the front porch, the person then causes sounds 102 of knocking on the door, which triggers the dog to bark 104, after which the wife yells "silence" 106. This scenario creates a lot of disturbance for the user and for the participants in the online meeting.

Various embodiments of this disclosure address this problem by operations, which may be performed using an machine learning model, that recognize the trigger sound (e.g., sound 100 of footsteps on the front porch) and predicts the probability of occurrence of the subsequent sequence of sounds, and which can trigger remedial action. The machine learning model detects occurrence of the trigger sound (e.g., sound 100 of footsteps on the front porch) predicts the probability of occurrence of a subsequent sound (e.g., sound 102 of knocking on the door) having a defined disturbance characteristic following the occurrence of the trigger sound. In one example, the probability of occurrence of the subsequent sound is determined to be "low."

The machine learning model detects the subsequent sound (e.g., sound 102 of knocking on the door) in sequence and determines following sounds in the sequence with certain probabilities and predicts the probability of occurrence of the next subsequent sound, "dog barking" 104 and person yelling "silence" 106 to be "high."

Because the probability of occurrence of the next subsequent sound, "dog barking" 104 and person yelling "silence" 106 having the defined disturbance characteristic is "high", the probability of occurrence satisfies a remedial action rule, which triggers a remedial action to be performed to mute the at least one microphone signal or to suppress the next subsequent sound in the at least one microphone signal. The remedial action may be performed by the predictive sound remediation component 212 and/or by notifying an on-line meeting application about the reason for the mute a "sudden high background noise."

This may potentially start a timer in first device/application that upon expiration reverts mute back into non-muted. The timer can be set based on a predicted duration of the subsequent sound.

Figure 9:
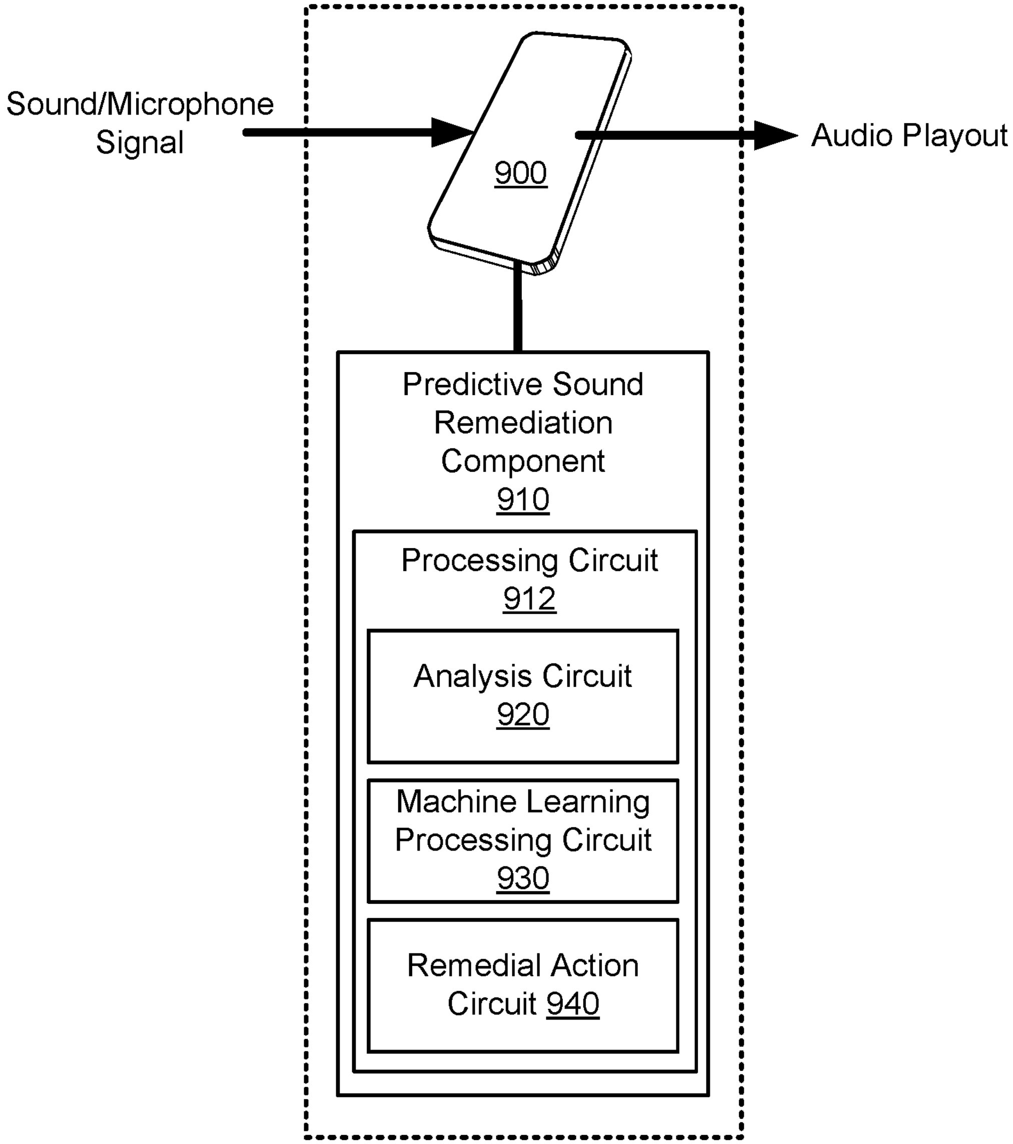
FIG. 9 illustrates a computing system that controls sound playout through a user device in accordance with some embodiments.

FIG. 9 illustrates a computing system that controls sound playout through a user device in accordance with some embodiments.

Referring to FIG. 9, the predictive sound remediation component includes at least one processing circuit 912 as part of the predictive sound remediation component 910. The predictive sound remediation component 910 may be located on the device 900 or communicatively coupled to the device 900. To facilitate explanation of various functional operations of the processing circuit 912, in the embodiment of FIG. 9 the processing circuit 912 is illustrated as including an analysis circuit 920, a machine learning processing circuit 930, and a remedial action circuit 940. The processing circuit 912 may have more or less circuits than are shown in FIG. 9. For example, as explained further below, any one or more of the analysis circuit 920, the machine learning processing circuit 930, and the remedial action circuit 940 may be combined into an integrated circuit or divided into two or more separate circuits. The user device 900 can be configured to receive a microphone signal which may be provided by a microphone circuit within the user device 900 or which is connected thereto through a wired or wireless connection. For example, a headset may include a microphone that is configured to provide a digitized microphone signal to the user device 900.

Although the analysis circuit 920, the machine learning processing circuit 930, and remedial action circuit 940 are illustrated as separate blocks in FIG. 9 and various other figures herein for ease of illustration and explanation only, any two or more of these circuits may be implemented in a shared circuit, and any of these circuits may be implemented at least partially in digital circuitry, such as by program code stored in at least one memory circuit which is executed by at least one processor circuit 912.

Figure 10:
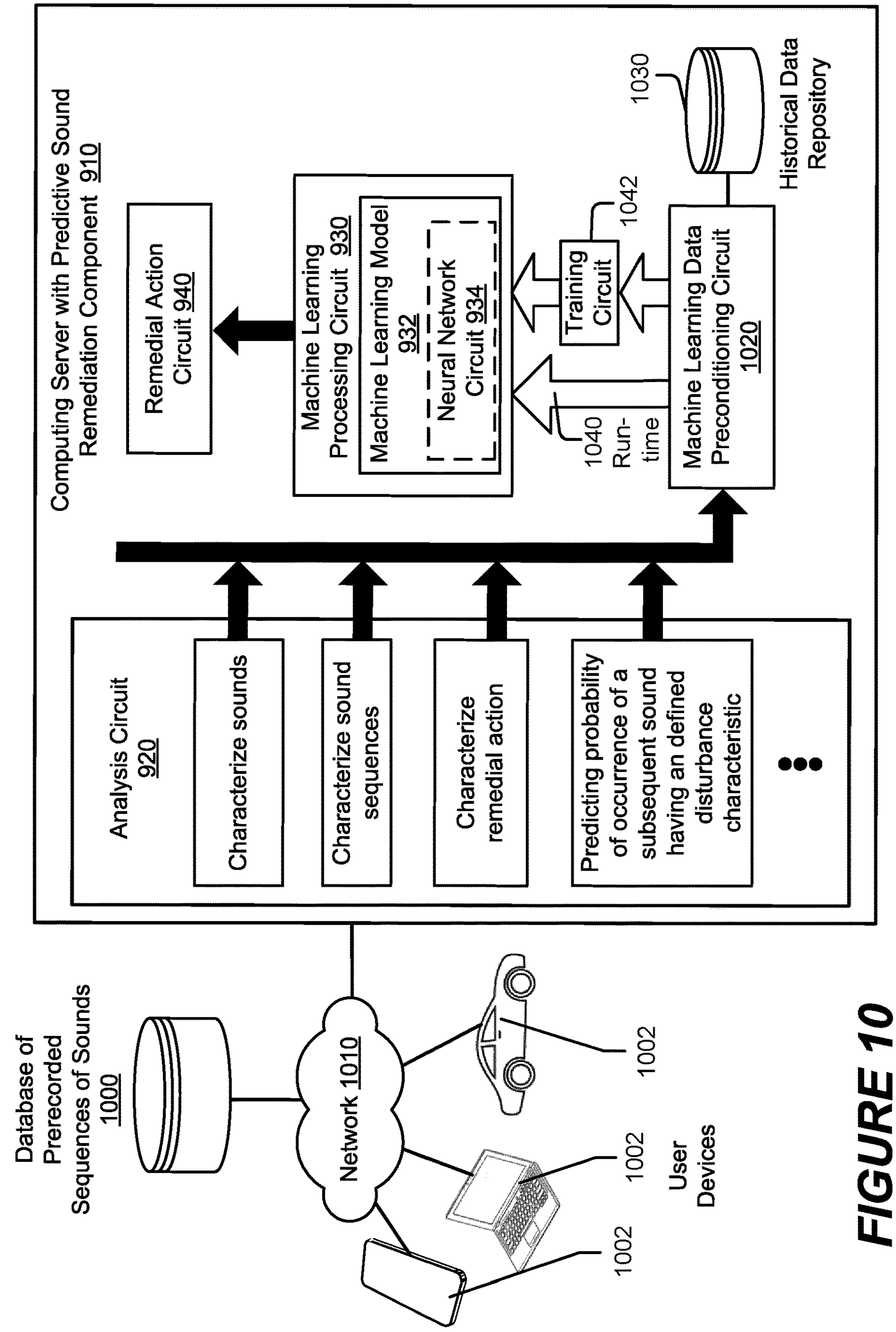
FIG. 10 illustrates component circuits of another computing system configured in accordance with some embodiments.

FIG. 10 illustrates component circuits of another computing system configured in accordance with some embodiments. Although predictive sound remediation component 910 is illustrated as being separate from and communicatively connected through a network 1010 to various illustrated types of user devices 1002 and a database of prerecorded sequences of sounds 1000, some or all of the circuit components (e.g., analysis circuit 920, the remedial action circuit 940, the machine learning processing circuit 930, the training circuit 1042, etc.) of the predictive sound remediation component 910 may be implemented by circuitry implemented in any one or more of the user devices 1002 and/or in the database 1000.

Referring to FIG. 10, the training circuit 1042 is configured to train the machine learning model 932 based on a combination of many parameters discussed in various embodiments herein.

An analysis circuit 920 is configured to analyze inputs from the user devices 1002 and/or the database 1000 of prerecorded sequences of sound for use in training the machine learning processing circuit 930.

The analysis circuit 920 may characterize sounds sensed by microphones of the user devices 1002 and/or sounds obtained from the database 1000. For example, the characterization can include characterizing at least one of sound frequency spectrum (such as the zero-crossing rate, spectral centroid, spectral roll-off, overall shape of a spectral envelope, chroma frequencies, etc.), sound acoustic fingerprint (based on a time-frequency graph of the ambient noise, which may also be called a spectrogram), sound loudness, and sound noise repetitive pattern.

The zero-crossing rate can correspond to the rate of sign-changes along a signal, i.e., the rate at which the signal changes from positive to negative or back. The spectral envelope can correspond to where the "center-of-mass" for a sound is located, and can be calculated as the weighted mean of the frequencies present in the sound. The spectral roll-off can correspond to a shape-measure of the signal, e.g. representing frequency below which a specified percentage of the total spectral energy is located lies. The overall shape can correspond to the Mel frequency cepstral coefficients (MFCCs) of a sound which are a small set of features (usually about 10-20) which concisely describe the overall shape of a spectral envelope. The chroma frequencies can correspond to a representation of sound in which the entire spectrum is divided into a defined number, e.g., 12, bins representing the defined number, e.g., 12, distinct semitones (or chroma) of the sound spectral octave.

The analysis circuit 920 may characterize sound sequences occurring in the sounds sensed by microphones of the user devices 1002 and/or sounds obtained from the database 1000.

The analysis circuit 920 may characterize remedial actions that are performed by the predictive sound remediation component 212 and/or by users responsive to occurrence of the characterized sounds. For example, the analysis circuit 920 may characterize user actions to mute a microphone, increase speaker volume, sensed movement of the presenter user device 200, pausing of audio playout, sensed closure of a door, sensed closure of a window, etc. responsive to occurrence of a characterized sound.

The analysis circuit 920 may predict the probability of occurrence of a subsequent sound having a defined disturbance characteristic based on the characterized sounds and the characterized sound sequences.

The machine learning processing circuit 930 is configured to be trained to predict probability of occurrence of a subsequent sound having a defined disturbance characteristic in the at least one microphone signal following the occurrence of the trigger sound, and when the probability of occurrence of the subsequent sound having the defined disturbance characteristic satisfies a remedial action rule, to trigger a remedial action to be performed to mute the at least one microphone signal or to suppress the subsequent sound in the at least one microphone signal. The machine learning processing circuit 930 may trigger the remedial action circuit 940 to perform the remedial action to mute the at least one microphone signal or to suppress the subsequent sound in the at least one microphone signal. The remedial action circuit 940 may at least partially reside within each of the user devices 1002.

The machine learning processing circuit 930 may operate in a run-time mode and a training mode, although those modes are not mutually exclusive and at least some training may be performed during run-time.

During run-time, the characterization data output by the analysis circuit 920 may be conditioned by a data preconditioning circuit 1020 to, for example, normalize values of the characterization data and/or filter the characterization data before being passed through run-time path 1040 to the machine learning processing circuit 930. The machine learning processing circuit 930 includes the machine learning model 932 which, in some embodiments, includes a neural network circuit 934. The characterization data is processed through the machine learning model 932 to predicting probability of occurrence of a subsequent sound having a defined disturbance characteristic in the at least one microphone signal following the occurrence of the trigger sound, and when the probability of occurrence of the subsequent sound having the defined disturbance characteristic satisfying a remedial action rule, triggering a remedial action to be performed to mute the at least one microphone signal or to suppress the subsequent sound in the at least one microphone signal.

During training, a training circuit 1042 adapts the machine learning model 932 based on the characterization data from the analysis circuit 920, which may be conditioned by the precondition circuit 1020, to predict probability of occurrence of sequences of sounds having defined disturbance characteristics. When the machine learning model 932 includes a neural network circuit 934, the training may include adapting weights of combining nodes in the neural network layers and/or adapting firing thresholds that are used by the combining nodes of the neural network circuit 934. The training circuit 1042 may train the machine learning processing circuit 930 based on historical characterization data values which may be obtained from a historical data repository 1030. The historical data repository 1030 may be populated over time with characterization data values that are output by the analysis circuit 920.

Figure 11:
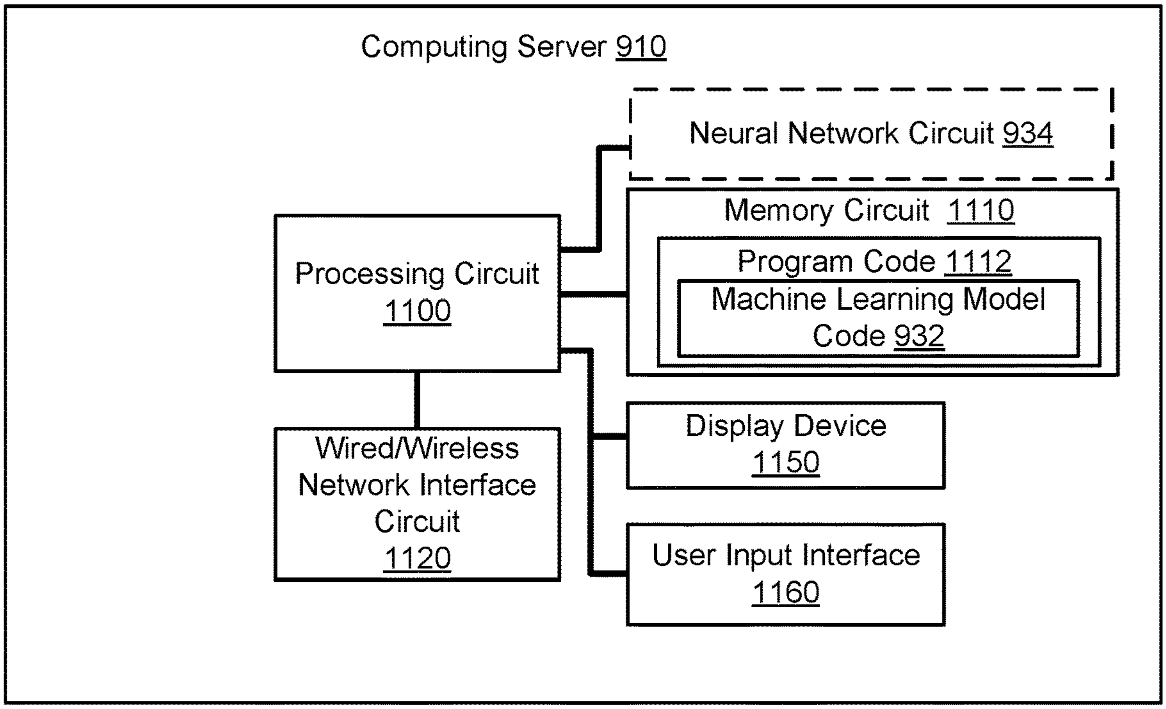
FIG. 11 is a block diagram of component circuits of a computing server which are configured to operate in accordance with some embodiments of the present disclosure.

FIG. 11 is a block diagram of component circuits of a computing server 910 which are configured to operate in accordance with some embodiments of the present disclosure. The computing server 910 may, for example, correspond to the virtual conference meeting server 210 (FIG. 2). Referring to FIG. 11, the computer server 910 includes a wired/wireless network interface circuit 1120, at least one processing circuit 1100 (processing circuit), and at least one memory circuit 1110 (memory) which is also described below as a computer readable medium. The processing circuit 1100 may correspond to the processing circuit 912 in FIG. 9. The memory 1110 stores program code 1112 that is executed by the processing circuit 1100 to perform operations disclosure herein for at least one embodiment of a computing server. The program code 1112 may include machine learning model code 932 which is configured to perform at least some of the operations recited herein for machine learning. The processing circuit 1100 may include one or more data processing circuits, such as a general purpose and/or special purpose processor (e.g., microprocessor and/or digital signal processor), which may be collocated or distributed across one or more data networks. The computing server 910 may further include a display device 1150 and a user input interface 1160.

Figure 12:
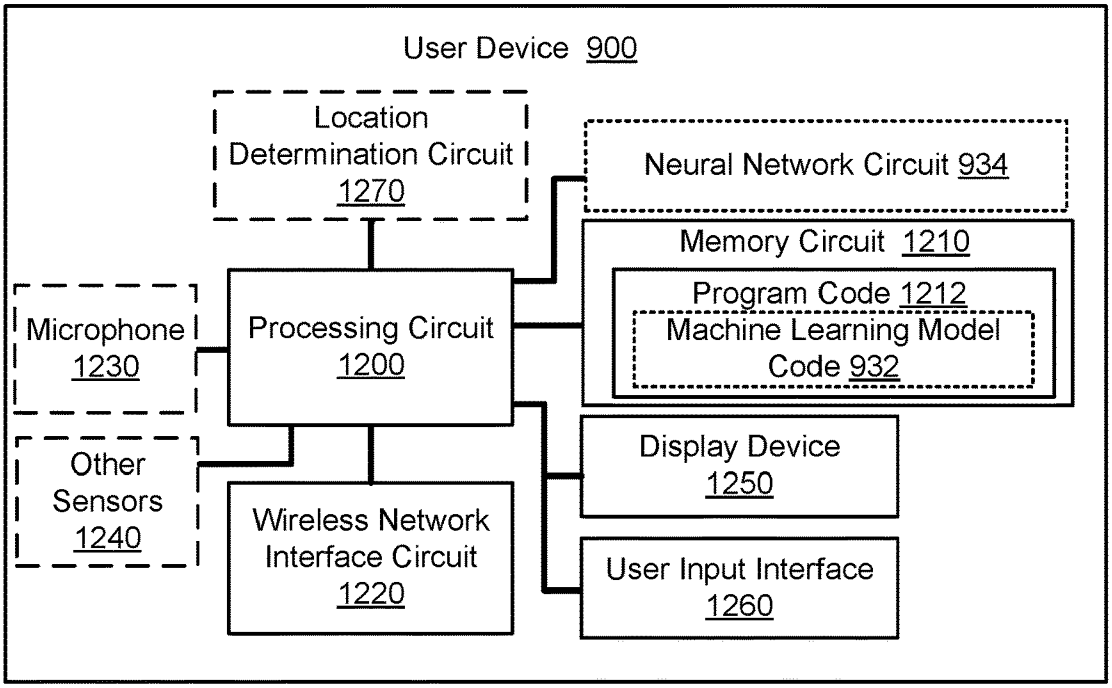
FIG. 12 is a block diagram of component circuits of a user device which can include functionality of an adaptive music system or can be communicatively connected to the adaptive music system, in accordance with some embodiments of the present disclosure.

FIG. 12 is a block diagram of component circuits of a user device 900 which can include functionality of a predictive sound remediation component or can be communicatively connected to the computing server, in accordance with some embodiments of the present disclosure. The user device 900 may, for example, correspond to the presenter user device 200 (FIG. 2) or the user devices 1002 (FIG. 10). The user device 900 can include a wireless network interface circuit 1220, at least one processing circuit 1200 (processing circuit), and at least one memory circuit 1210 (memory) which is also described below as a computer readable medium. The processing circuit 1200 may correspond to the processing circuit 912 in FIG. 9. The memory 1210 stores program code 1212 that is executed by the processing circuit 1200 to perform operations disclosure herein for at least one embodiment of the user device. The program code 1212 may include machine learning model code 932 which is configured to perform at least some of the operations recited herein for machine learning. The processing circuit 1200 may include one or more data processing circuits, such as a general purpose and/or special purpose processor (e.g., microprocessor and/or digital signal processor), which may be collocated or distributed across one or more data networks. The user device 900 may further include a location determination circuit 1270, a microphone 1230, a display device 1250, and a user input interface 1260 (e.g., keyboard or touch sensitive display). The location determination circuit 1270 can operate to determine the geographic location of the user device 900 based on satellite positioning (e.g., GNSS (Global Navigation Satellite Systems), GPS (Global Positioning System), GLONASS, Beidou or Galileo) and/or based on ground-based network-assisted positioning (e.g., cellular tower triangulation based on signaling time-of-flight or Wi-Fi based positioning). The user device 900 may include other sensors 1240, such as a camera.

Some of the embodiments of the present disclosure include a machine learning model that is used to detect a certain sound, i.e. a trigger-sound, in a sequence of detected ambient sounds. The machine learning model is trained on sequences of sounds, which are classified in terms of: a first triggering sound 102 registered by at least one microphone and the sound's transient/level and duration in time, a next sound in sequence 104 with timing relative to first sound 102 and the next sound's transient/level and duration in time, subsequent sounds 106 with timing data and the subsequent sound's transient/level and duration in time, and the context data.

The machine learning model is trained using input from the device microphones. The training focus on sequences of sounds, sound levels, spectral characteristics, and their relations in time, spatially and with respect to (user) context parameters.

The machine learning model will, based on a trigger-sound inference, infer/predict the sequence of sounds following the trigger-sound. The prediction will determine which sound(s) in a sequence of sounds that hardware or application shall adapt to, based on probability and degree of disturbance, e.g. high-medium-low related to its transients, dB level, duration in time, direction, current context parameters, etc.

Figure 6:
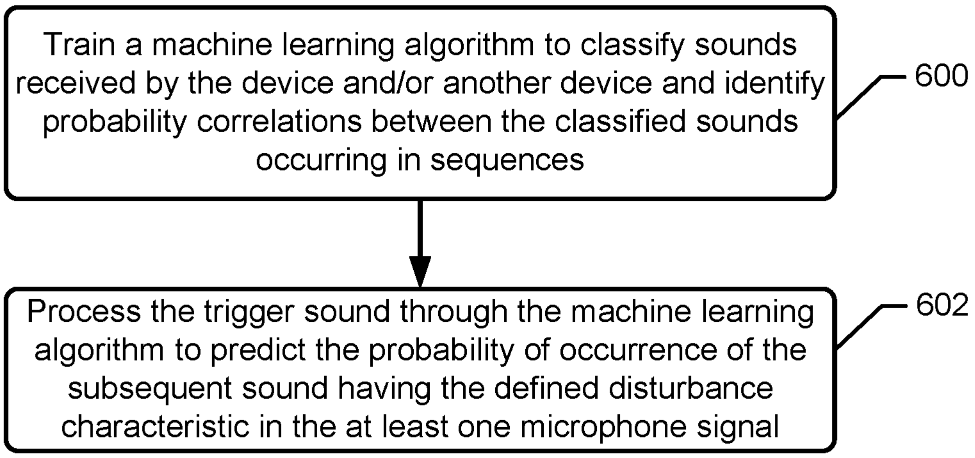
Figure 7:
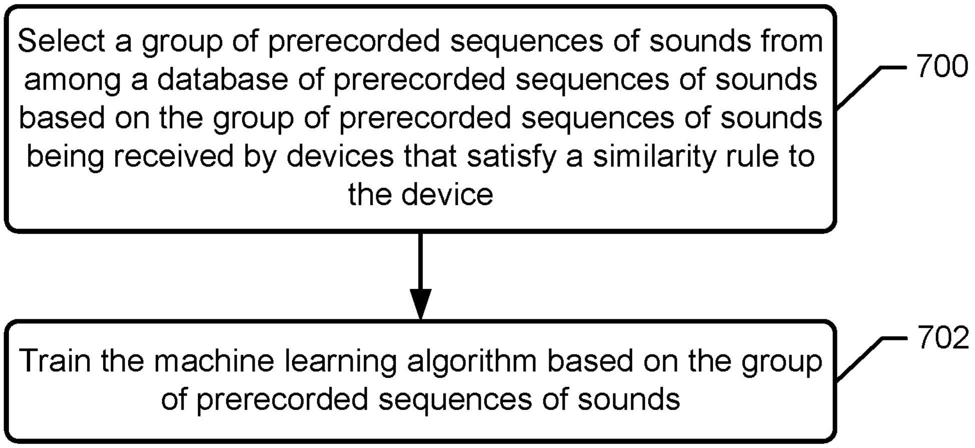
Figure 8:
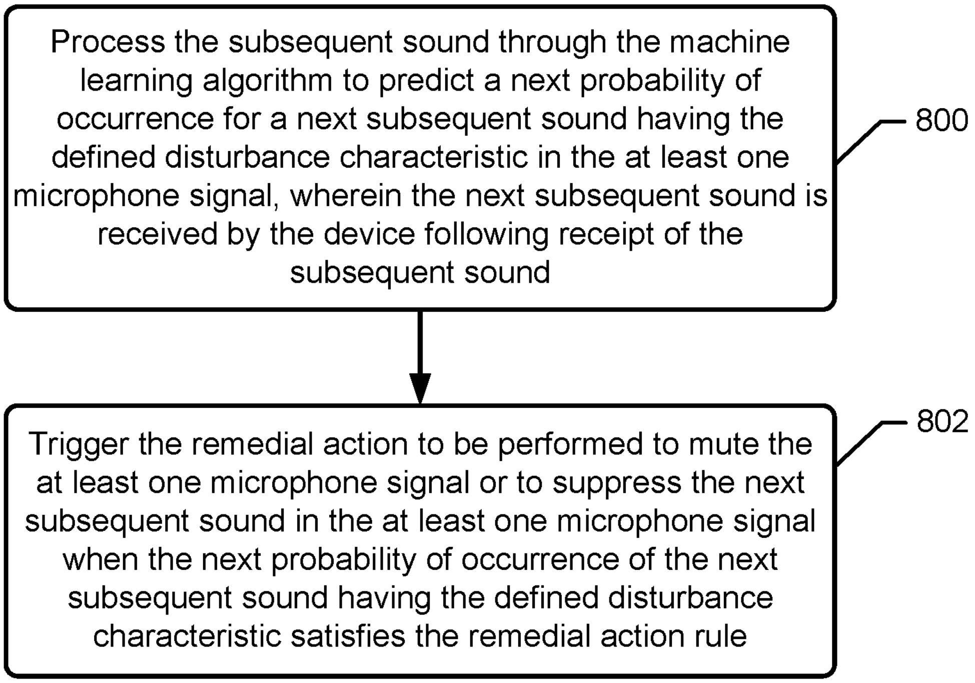

FIGS. 6, 7, and 8 illustrate flowcharts of operations performed by a device, such as the presenter user device 200 or the virtual conference meeting server 210, performing machine learning training techniques in accordance with some embodiments of the present disclosure.

In the operational embodiment of FIG. 6, the operations include training 600 a machine learning algorithm to classify sounds received by the device and/or another device and identify probability correlations between the classified sounds occurring in sequences. The operations also include processing 602 the trigger sound through the machine learning algorithm to predict the probability of occurrence of the subsequent sound having the defined disturbance characteristic in the at least one microphone signal.

In some embodiments, the operations further include selecting the machine learning algorithm to be trained from among a set of machine learning algorithms based on at least one of the following context parameters: device location data when one of the sounds to be classified occurred; time data when one of the sounds to be classified occurred; date data when one of the sounds to be classified occurred; a characteristic of a background noise component that occurred when one of the sounds to be classified occurred; and sensor data indicating a sensed type of object or environmental parameter.

In some embodiments, the training 600 of the machine learning algorithm further comprises training the machine learning algorithm based on user feedback indicating whether the sound to be classified has a defined disturbance characteristic.

Referring to the operational example of FIG. 7, the training 600 of the machine learning algorithm further includes selecting 700 a group of prerecorded sequences of sounds from among a database of prerecorded sequences of sounds based on the group of prerecorded sequences of sounds being received by devices that satisfy a similarity rule to the device. The operations also include training 702 the machine learning algorithm based on the group of prerecorded sequences of sounds.

Figure 13:
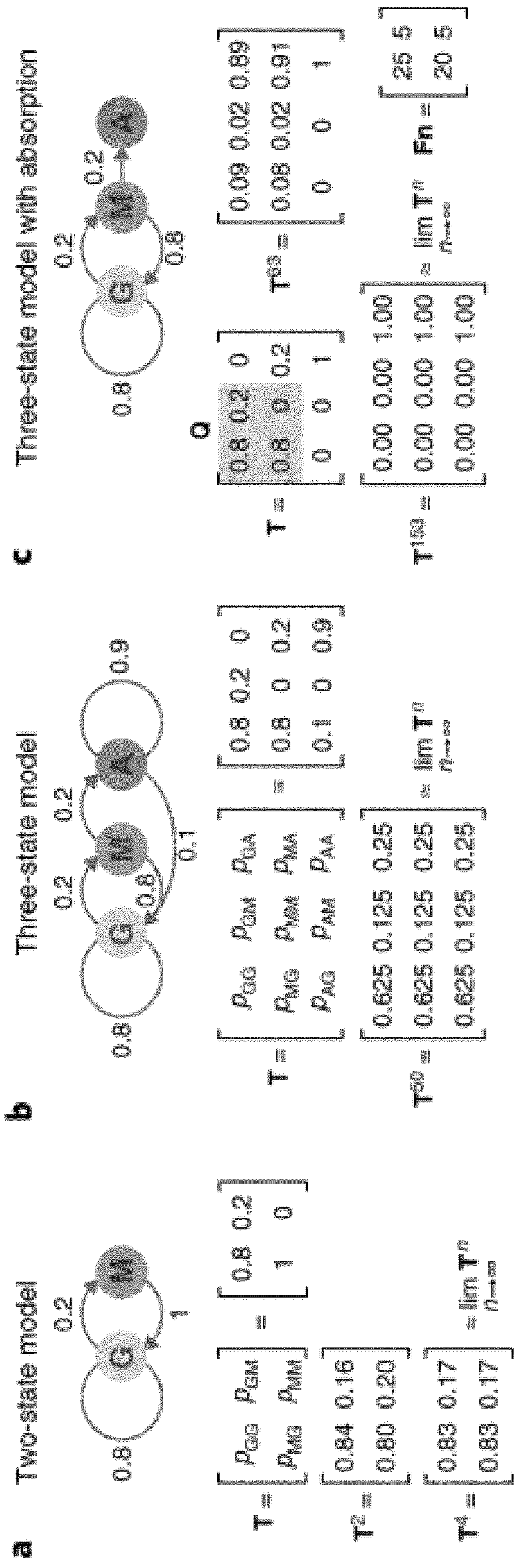
FIG. 13 illustrates a Markov chain for a sequence of sounds in accordance with some embodiments of the present disclosure.

Further embodiments are directed to repeating the operations for a sequence of sounds, e.g., which can be represented as a Markov state model such as shown in FIG. 13, which is described below.

Referring to the operational example of FIG. 8, operations also include processing 800 the subsequent sound through the machine learning algorithm to predict a next probability of occurrence for a next subsequent sound having the defined disturbance characteristic in the at least one microphone signal, wherein the next subsequent sound is received by the device following receipt of the subsequent sound. Operations also include triggering 802 the remedial action to be performed to mute the at least one microphone signal or to suppress the next subsequent sound in the at least one microphone signal when the next probability of occurrence of the next subsequent sound having the defined disturbance characteristic satisfies the remedial action rule.

In some embodiments, the operations further include training a machine learning algorithm to indicate when the probability of occurrence of the subsequent sound having the defined disturbance characteristic satisfies the remedial action rule.

The training of the machine learning algorithm can include training the machine learning algorithm based on user feedback indicating when the remedial action is triggered by the user.

The training of the machine learning algorithm can include training the machine learning algorithm based on user feedback indicating the user has performed at least one of the following remedial actions: user muted the at least one microphone; user increased speaker volume; user moved the device away from a location when the subsequent sound occurred; and the device detecting indication that the user performed an action separate from operation of the device to suppress the subsequent sound. This "detecting" includes detecting when a user has closed a door, window, etc.

In another embodiment the machine learning model and/or parts of the machine learning model is trained centrally on general sound sequences and/or sound sequences gathered from a demographic population, and then the trained model is pushed to user device for inference usage.

Various embodiments of the present disclosure describe a way to train a model on a sequence of sounds and to train how sounds are related in time and sequence depending on different contexts. For example, device capabilities, first user context (at home, family at home, time of day etc.), presence of users in meeting, etc. Another example includes correlations between first (trigger) sound and subsequent sounds following the trigger sound, where the subsequent sounds are associated with certain probabilities, in cascade to third-level-sound and fourth-level-sounds, each plausible with probabilities T3% and F4%. Such as, a "doorbell" will with 91% probability cause "dog bark" where the "dog bark" with 99% probability falls into spectral mask of #Daisy, the dog."

Yet another example includes a correlation of level of disturbance with a certain sound in the sequence. This may be done using supervised learning or a combination of unsupervised and supervised learning.

A sequence of sounds may also be trained related to time (audible time) and frequency samples (like 8-16 kHz). Also, the timing between sounds in a sequence is of importance.

The establishment of a first sound (i.e. trigger-sound) to cause a certain sequence of subsequent sounds, or in fact cause a second sound that in terms may evolve into subsequent sound or terminate, may be thought of in terms of Markov chain. FIG. 13 illustrates a Markov chain representation of a sequence of sounds in accordance with some embodiments of the present disclosure. FIG. 13 includes example probabilities and matrices for illustration of an example of a Markov chain.

Referring to FIG. 13, for simplicity, assume three sounds G, M and A, then a hypothetical Markov state may be denoted by T, there Tij are the corresponding probabilities one sound follows another sound. One basic property of a Markov chain is that only the most recent point in the event path (a.k.a. trajectory) affects what happens next, this is typically denoted as the Markov Property. Let {X0, X1, X2, . . . } be a sequence of discrete random variables. Then {X0, X1, X2, . . . } is a Markov chain given fulfillment of the Markov property: $P(X_{t+1}=s|X_t=s_t, \ldots, X_0=s_0)=P(X_{t+1}=s|X_t=s_t)$, for all t=1, 2, 3, . . . , and for all states s0, s1, . . . , st, s.

Then, in e.g. a three-state model, given that a trigger-sound G is detected, then there is an 80% probability that sound G occurs again, and 20% that sound M occurs; if then at "next time instance" we have emerged at sound M, there is a 80% probability that sound G is next to happen and 20% that we go back to sound G, if we then at "next time instance" somehow have ended at sound A, there is a 90% probability that another A-sound is next and 10% probability that sound G reoccurs, and zero probability (i.e. have not previously been detected by the machine learning model) that sound M follows after sound A.

Then the operations can determine what the probability of any specific path is; and given the Markov property that only the most recent point in the event path affects what happens next, the operations can calculate the probability of any trajectory by multiplying together the starting probability and all subsequent single-step probabilities. For example, a calculation according to $P(X_2=5|X_0=1)$ means considering transitions getting from the state 1 at the moment 0, to the state 5, at the moment 2.

One approach may comprise that the machine learning model detects and classifies sequences of sounds determining probability factors of the Markov state transitions matrices.

One approach furthermore may comprise that user context may be described by different state transitions matrices; one "work matrix" and e.g. one "free time" matrix; alternatively, that an all-transition-state matrix is represented where all (given physically present objects) possible states are represented, but that some state-state transition may be barred (i.e. considered non-causal or non-physical) such as "doorbell generates dog bark, but dog is not at home", or similar.

The machine learning model is furthermore assumed to train (adjust) state transition entries in context of present object in users' context.

Figure 14:
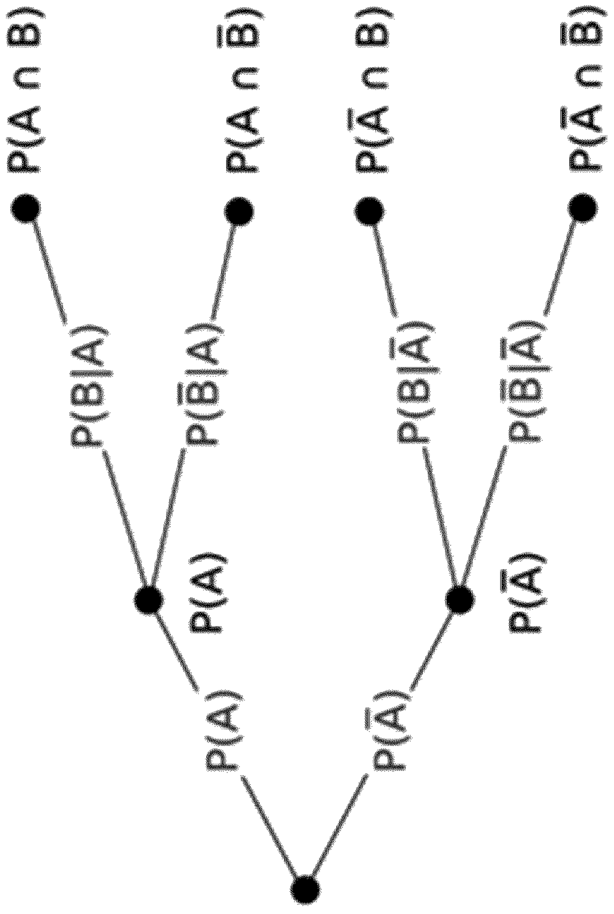
FIG. 14 illustrates conditional probability of a subsequent sound accordance with some embodiments of the present disclosure.

Following known principles of conditional probability, i.e. given that doorbell is the known starting state, what are the conditional probability that a disturbing dog bark is caused, according to FIG. 14. FIG. 14 illustrates conditional probability of a subsequent sound following a first sound in accordance with some embodiments of the present disclosure.

Relaxing the previous-state-only requirement one may also consider other elaborate calculation schemes.

Above approach of a machine learning model adjusting transition coefficients between events (states) or with the conditional probability approach may also be considered in context of deep learning network, decision tree, Bayesian networks, or similar.

A federated learning ("FL") system may be used in various embodiments of the present disclosure. In an FL system, a centralized server, known as master or master entity, is responsible for maintaining a global model which is created by aggregating the models/weights which are trained in an iterative process at participating nodes/clients, known as workers or worker entities, using local data.

FL depends on continuous participation of workers in an iterative process for training of the model and communicating the model weights with the master. The master can communicate with different number of workers ranging between tens to millions, and the size of model weight updates which are communicated can range between kilobytes to tens of megabytes.

Federated Learning (FL) is an approach that can be used to train models for use on different systems. However, the model lifecycle that is typically used for federated learning may be rigid, since:

1) It is does not allow for a new worker to join an active federation. New workers can only be onboarded during the selection process.
2) It does not address the feature selection problem, as different features may not have equal importance to all operators.
3) The product of the federation is a federated averaged model which may fail at matching individual operator characteristics while trying to capture the characteristics of all operators.
4) Even though federated learning can run on any type of device (e.g., mobile device, base station, network node, etc.), it typically assumes that all devices have equal capabilities and may not take into consideration data transfer costs that may be incurred while a federation takes place. As such, federations can only follow a very rigid master to worker cycle which can be limited in some cases.
5) Federated Learning generates a federated model. While this may make sense from a long-term perspective, there are cases where isolated training or even centralized training could yield better performance.

Some embodiments described herein address one or more of the challenges associated with Federated Learning. In particular, some embodiments described herein address one or more of these challenges via federated feature selection, federated model fine tuning, and/or dynamic selection of computation resources for a federated model.

Federated feature selection involves selection of system features for inclusion in a neural network. Model fine tuning involves tuning a local model using federated information supplied by a master entity. Dynamic selection of computation resources for a federated model may involve calculating or estimating memory requirements, processing power (e.g., floating point operations per second, or FLOPS), availability of resources, and network data transfer resources to create a computational topology of an FL model for training/inference. Depending on the capability/availability of different devices, decisions may be made to federate or not to federate, to pretrain, not pretrain, fallback to more specific models, etc.

In some embodiments, operations further include generating a visual, audible, and/or tactile notification to a user indicating that the remedial action is about to be triggered and/or has been triggered.

In these embodiments, information about soon-to-be suppressed or muted unwanted sounds are further relayed to the user as user interface ("UX") elements giving the user the possibility to selectively override system defaults under certain circumstances. One example is a mute-dog button that could be made available to the user [in a mobile device, extended reality ("XR") glasses, etc.] if the system based on current context and possible sequences of sounds contains barking sound components deduced to come from dog source. In other words the user would have the possibility to switch on off suppressing or muting of unwanted sound components in a sequence of multiple components, and each component could be displayed to the user as a representation of its most likely source based on object recognition from audio input. A camera could be used to further improve the object recognition.

In some embodiments, identifying occurrence of a trigger event observed by a home agent system, wherein the operation to predict the probability of occurrence of the subsequent sound having the defined disturbance characteristic in the at least one microphone signal following the occurrence of the trigger sound, is further based on the identified occurrence of the trigger event. The home agent may include a camera that is configured to identify presence of people, identify particular persons, identify presence of animals, identify particular animals, identify opening and closing of doors, identify opening and closing of windows, etc. The home agent may include a microphone that is configured to identify certain types of sounds, such as doorbell, telephone ringer, fire alarm, etc.

In these embodiments, the trigger event observed by the home agent system comprises at least one of: a doorbell; a fire alarm; a notification of imminent package or service delivery; and a scheduled incoming call.

In emerging home automation solutions, it may become common that apart from being "only" a smart home agent that listens for habitants vocally expressed outcall for pizza and upon that orders pizza (e.g. as with Alexa), that the solution also manages e.g. door-bell, light system, etc.

Then the above discussed solution with detecting an event-chain that later on may/may not cause some disturbance, same machine learning-model learning, etc. may be managed by the home automation system; in that, a system controlling e.g. doorbell and user-associated speakers/microphones, may in a first step detect that doorbell is invoked by someone on the outside (but not yet starting play-out of the ding-dong-sound), in a second step identify the doorbell as trigger-sound for later dog bark (given user context, etc.) and from that determine that some selected user-speaker may be muted, in a third step invoke microphone mute, and in a later step determine speakers to be muted according to selected rule, and after that invoke playout of doorbell ding-dong-sound.

The home agent system may in this aspect be designed with a "do-not-disturb" setting that may be automatically invoked giver user context.

Further Definitions and Embodiments

In the above description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id Est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the following examples of embodiments and their equivalents, and shall not be restricted or limited by the foregoing detailed description.

The invention claimed is:

1. A device comprising:

at least one processor configured to receive at least one microphone signal from at least one microphone; and at least one memory storing program code executable by at least one processor to perform operations comprising:

identifying occurrence of a trigger sound in the at least one microphone signal;

predicting probability of occurrence of a subsequent sound having a defined disturbance characteristic and satisfying a defined disturbance level in the at least one microphone signal following the occurrence of the trigger sound; and when the probability of occurrence of the subsequent sound having the defined disturbance characteristic satisfies a remedial action rule, triggering a remedial action to be performed to mute the at least one microphone signal or to suppress the subsequent sound in the at least one microphone signal, wherein the operation to trigger the remedial action to be performed to mute the at least one microphone signal or to suppress the subsequent sound in the at least one microphone signal comprises:

predicting time delay between occurrence of the trigger sound and start of the subsequent sound; and triggering the remedial action to begin based on expiration of the time delay following the occurrence of the trigger sound.

2. The device of claim 1, wherein the operation to predict the probability of occurrence of the subsequent sound satisfying the defined disturbance level, comprises determining probability of at least one condition being met, wherein the at least one condition comprises:

a predicted peak decibel level of the subsequent sound exceeding a peak threshold;

a predicted duration of the subsequent sound exceeding a duration threshold;

a predicted frequency component of the subsequent sound being within a defined frequency band; or the subsequent sound having a predicted sound category that has been defined as unacceptable.

3. The device of claim 1, wherein an operation to determine when the probability of occurrence of the subsequent sound having the defined disturbance characteristic satisfies the remedial action rule, comprises determining whether at least one context parameter satisfies the remedial action rule, wherein the at least one context parameter comprises:

device location data when the trigger sound occurs;

time data when the trigger sound occurs;

date data when the trigger sound occurs;

characteristic of a background noise component in the at least one microphone signal;

user input data indicating whether the remedial action is to be triggered;

indication that a defined sound source type has been identified by a camera; or user demographic characteristics.

4. The device of claim 1, wherein the operation to trigger the remedial action to be performed to mute the at least one microphone signal or to suppress the subsequent sound in the at least one microphone signal comprises:

predicting duration of the subsequent sound; and muting the at least one microphone signal or suppressing the subsequent sound in the at least one microphone signal, for a time duration determined based on the predicted duration of the subsequent sound.

5. The device of claim 1, wherein the operations further comprise:

training a machine learning algorithm to classify sounds received by the device or another device and identify probability correlations between the classified sounds occurring in sequences; and processing the trigger sound through the machine learning algorithm to predict the probability of occurrence of the subsequent sound having the defined disturbance characteristic and satisfying the defined disturbance level in the at least one microphone signal.

6. The device of claim 1, wherein the operations further comprise:

generating a visual, audible, or tactile notification to a user indicating that the remedial action is about to be triggered or has been triggered.

7. The device of claim 1, wherein the operations further comprise:

identifying occurrence of a trigger event observed by a home agent system, wherein the operation to predict the probability of occurrence of the subsequent sound having the defined disturbance characteristic and satisfying the defined disturbance level in the at least one microphone signal following the occurrence of the trigger sound, is further based on the identified occurrence of the trigger event.

8. The device of claim 7, wherein the trigger event observed by the home agent system comprises at least one of:

a doorbell;

a fire alarm;

a notification of imminent package or service delivery; or a scheduled incoming call.

9. A method by a device, the method comprising:

identifying occurrence of a trigger sound in at least one microphone signal received from at least one microphone;

predicting probability of occurrence of a subsequent sound having a defined disturbance characteristic and satisfying a defined disturbance level in the at least one microphone signal following the occurrence of the trigger sound; and when the probability of occurrence of the subsequent sound having the defined disturbance characteristic satisfies a remedial action rule, triggering a remedial action to be performed to mute the at least one microphone signal or to suppress the subsequent sound in the at least one microphone signal, wherein the triggering the remedial action to be performed to mute the at least one microphone signal or to suppress the subsequent sound in the at least one microphone signal comprises:

predicting time delay between occurrence of the trigger sound and start of the subsequent sound; and triggering the remedial action to begin based on expiration of the time delay following the occurrence of the trigger sound.

10. The method of claim 9, the prediction of the probability of occurrence of the subsequent sound satisfying the defined disturbance level, comprises determining probability of at least one condition being met, wherein the at least one condition comprises:

a predicted peak decibel level of the subsequent sound exceeding a peak threshold;

a predicted duration of the subsequent sound exceeding a duration threshold;

a predicted frequency component of the subsequent sound being within a defined frequency band; or the subsequent sound having a predicted sound category that has been defined as unacceptable.

11. The method of claim 9, where determination of when the probability of occurrence of the subsequent sound having the defined disturbance characteristic satisfies the remedial action rule, comprises determining whether at least one context parameter satisfies the remedial action rule, wherein the at least one context parameter comprises:

device location data when the trigger sound occurs;

time data when the trigger sound occurs;

date data when the trigger sound occurs;

characteristic of a background noise component in the at least one microphone signal;

user input data indicating whether the remedial action is to be triggered;

indication that a defined sound source type has been identified by a camera; or user demographic characteristics.

12. The method of claim 9, wherein the triggering of the remedial action to be performed to mute the at least one microphone signal or to suppress the subsequent sound in the at least one microphone signal comprises:

predicting duration of the subsequent sound; and muting the at least one microphone signal or suppressing the subsequent sound in the at least one microphone signal, for a time duration determined based on the predicting duration of the subsequent sound.

13. The method of claim 9, further comprising:

training a machine learning algorithm to classify sounds received by the device or another device and identify probability correlations between the classified sounds occurring in sequences; and processing the trigger sound through the machine learning algorithm to predict the probability of occurrence of the subsequent sound having the defined disturbance characteristic and satisfying the defined disturbance level in the at least one microphone signal.

14. The method of claim 9, further comprising:

generating a visual, audible, or tactile notification to a user indicating that the remedial action is about to be triggered or has been triggered.

15. The method of claim 9, further comprising:

identifying occurrence of a trigger event observed by a home agent system, wherein the operation to predict the probability of occurrence of the subsequent sound having the defined disturbance characteristic and satisfying the defined disturbance level in the at least one microphone signal following the occurrence of the trigger sound, is further based on the identified occurrence of the trigger event.

16. The method of claim 15, wherein the trigger event observed by the home agent system comprises at least one of:

a doorbell;

a fire alarm;

a notification of imminent package or service delivery; or a scheduled incoming call.

* * * * *